April 29, 1952  F. M. WILLBRANDT  2,595,035
CARTON FILLING AND WEIGHING MACHINE
Filed Sept. 10, 1947  5 Sheets-Sheet 1

INVENTOR.
Franklin M. Willbrandt
BY
ATTORNEY

April 29, 1952  F. M. WILLBRANDT  2,595,035
CARTON FILLING AND WEIGHING MACHINE
Filed Sept. 10, 1947  5 Sheets-Sheet 2

INVENTOR.
Franklin M. Willbrandt
BY
Otis A. Earl
ATTORNEY

April 29, 1952   F. M. WILLBRANDT   2,595,035
CARTON FILLING AND WEIGHING MACHINE
Filed Sept. 10, 1947   5 Sheets-Sheet 3

INVENTOR.
Franklin M. Willbrandt
BY
Otis A. Earl
ATTORNEY

April 29, 1952     F. M. WILLBRANDT     2,595,035
CARTON FILLING AND WEIGHING MACHINE
Filed Sept. 10, 1947     5 Sheets-Sheet 4
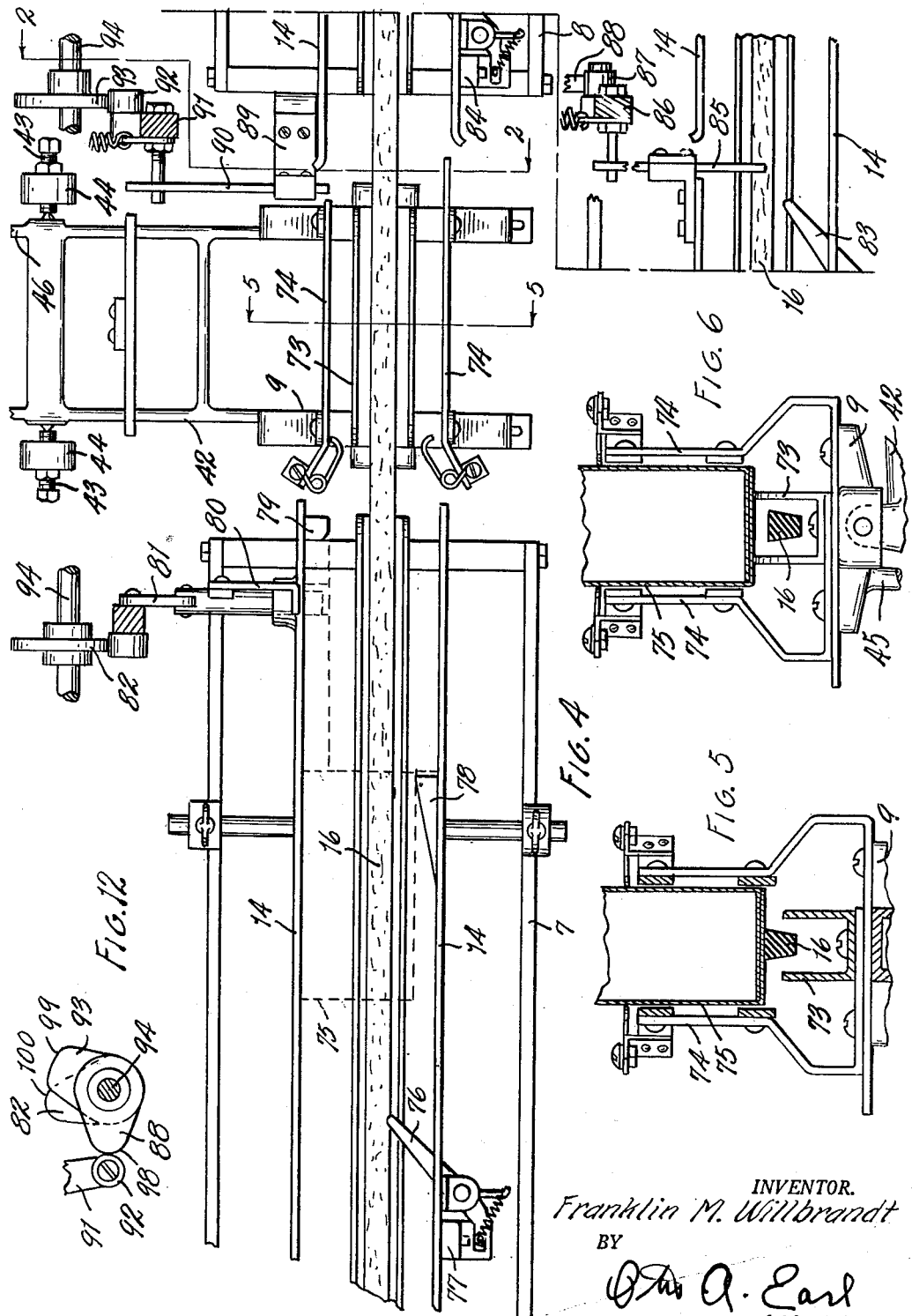
INVENTOR.
Franklin M. Willbrandt
BY
Otto A. Earl
ATTORNEY April 29, 1952  F. M. WILLBRANDT  2,595,035
CARTON FILLING AND WEIGHING MACHINE
Filed Sept. 10, 1947  5 Sheets-Sheet 5
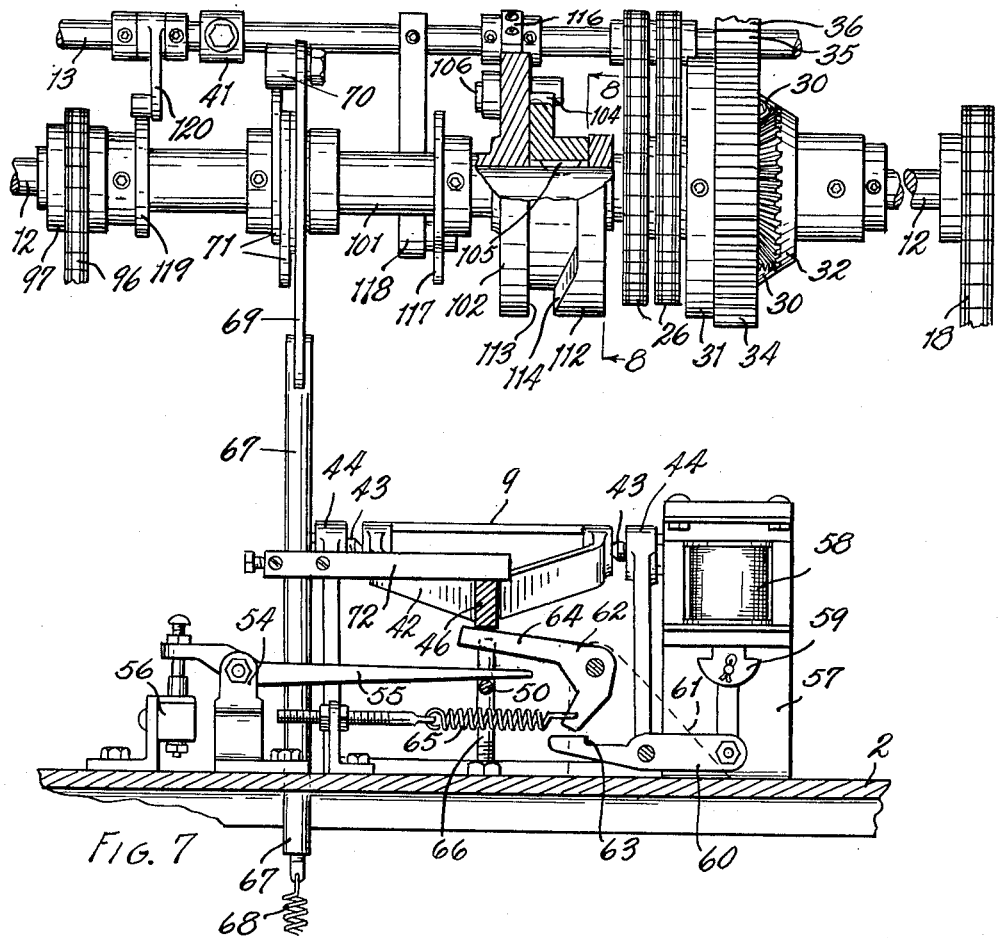
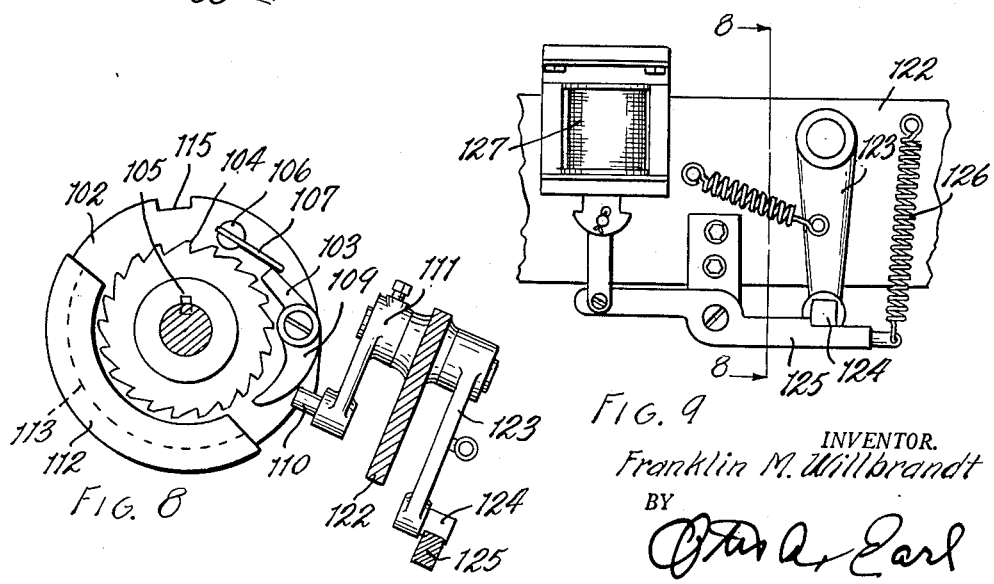
INVENTOR.
Franklin M. Willbrandt
BY
ATTORNEY Patented Apr. 29, 1952

2,595,035

UNITED STATES PATENT OFFICE 2,595,035

CARTON FILLING AND WEIGHING MACHINE

Franklin M. Willbrandt, Battle Creek, Mich., assignor to Battle Creek Bread Wrapping Machine Company, Battle Creek, Mich.

Application September 10, 1947, Serial No. 773,247

39 Claims. (Cl. 249—59)

This invention relates to improvements in a carton filling and weighing machine.

The principal objects of this invention are:

First, to provide an automatic filling and weighing machine having a continuously operating conveyor belt for moving cartons through the machine.

Second, to provide novel filling mechanism for filling cartons with a granular, flake or powdered product which is controlled by a scale measuring the quantity of material in the carton.

Third, to provide novel feed mechanism for a carton filling machine which is operated from a continuously rotating driving member and controlled by an intermittently operated reset clutch member.

Fourth, to provide an automatic filling and weighing machine in which the filling mechanism is controlled by an intermittently operating cam member and a series of electrical switches actuated by the position of the cartons in the machine and the position of a scale beam for weighing the cartons.

Fifth, to provide a starting control for the filling mechanism of a carton filling machine which is inoperative except when a filled carton has been discharged from the machine and when an adequate supply of new cartons is ready to be introduced into the machine and when a scale member underneath the filling mechanism has completed a fixed resetting cycle.

Sixth, to provide a carton filling and weighing machine having a continuously moving conveyor and carton locating stops and control switches arranged to prevent the recycling of the filling mechanism before a filled carton is completely removed from the filling station.

Seventh, to provide resetting mechanism for a carton filling and weighing machine which resets the weighing mechanism and starts the filling mechanism of the machine automatically upon proper supply to and removal of cartons from the machine and actuation of a scale switch.

Eighth, to provide resetting mechanism for a carton filling and weighing machine which is actuated by and in turn controls the proper supply to and removal of cartons in the machine.

Ninth, to provide a carton filling and weighing machine which will stop automatically upon interruption of the supply of empty cartons to the machine and restart itself automatically upon resupply of empty cartons to the machine.

Tenth, to provide a scale pan and beam for a weighing machine which is electrically lowered when a carton being filled reaches the proper weight and raised to weighing position by mechanical operation of resetting mechanism of the machine.

Eleventh, to provide a scale pan and beam for a weighing and filling machine that are magnetically stabilized between the weighing cycles thereof and while cartons are being shifted on the machine.

Other objects and advantages relating to the details and economies of the invention will be apparent from the following description and claims.

The drawings, of which there are five sheets, illustrate a preferred form of my filling and weighing machine.

Fig. 4 is a fragmentary plan view of the carton conveyor shown in Figs. 1, 2 and 3 and illustrating cartons thereon in dotted lines, a portion of the figure being offset below the main portion of the figure.

Fig. 5 is a fragmentary vertical cross sectional view along the line 5—5 in Fig. 4 and illustrating an empty carton entering the filling station and prior to being picked up by the scale pan of the machine.

Fig. 6 is a fragmentary vertical cross sectional view similar to Fig. 5 but illustrating the carton and scale pan in raised position arranged to weigh the carton and its contents.

Fig. 7 is a fragmentary rear elevational view of the weighing mechanism and the drive shaft for operating the machine.

Fig. 8 is a fragmentary cross sectional view along the broken line 8—8 in Fig. 7.

Fig. 9 is a fragmentary elevational view of the solenoid and lever which control the starting of the operating cycle of the machine.

Fig. 10 is a schematic wiring diagram of the electrical control system of the machine as it will appear when the supply of empty cartons to the machine is interrupted.

Fig. 12 is an end elevational view of the carton control cam shaft shown in Figs. 2, 3 and 4.

Figure 1:
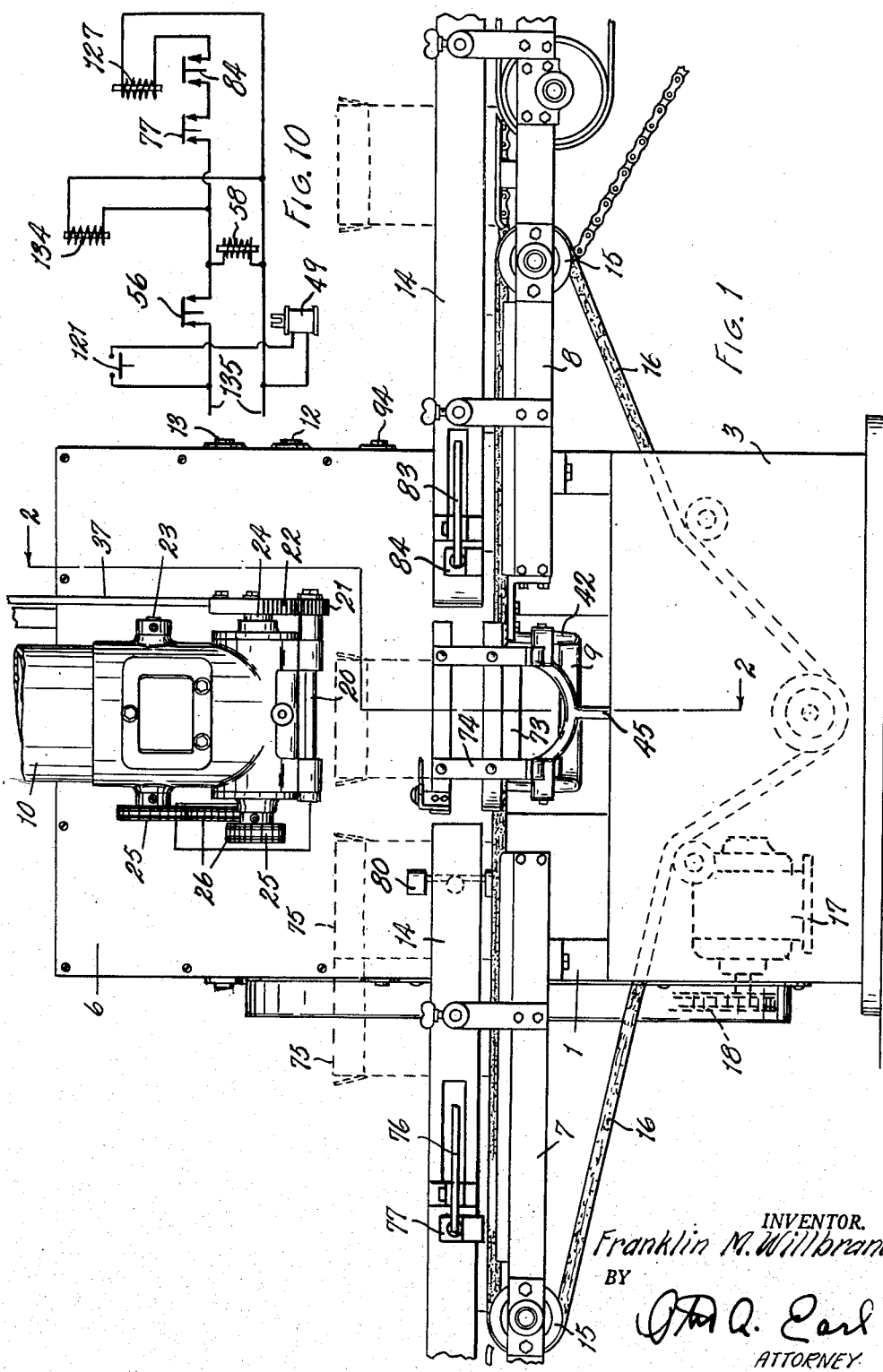
Fig. 1 is a fragmentary front elevational view of my machine with a series of cartons thereon indicated in dotted lines, the supply of cartons indicated being insufficient for continued operation of the machine.

Naturally the speed with which a series of cartons may be filled and weighed depends on the speed with which the product is dispensed, a high feeding rate resulting in a high output of cartons. However, the percentage of weight discrepancy increases with the feeding rate since any uncontrolled feed or "dribble" incident to shutting off a large flow of the product amounts to a larger percentage of the total carton weight than when a small flow of material is interrupted. It is also evident that the accuracy with which any machine will react to cut off the flow of material is increased by reducing the feeding rate of the machine since less material will leak or dribble out of the machine while the shut off mechanism is operating.

I have illustrated and will describe a single filling and weighing machine which operates to rapidly fill and accurately weigh cartons of various types of products. While the machine will operate satisfactorily alone, I have found that the filling operation may be greatly speeded up and the accuracy of the weight of material in each carton more closely controlled by operating my machine in series with one or more other filling machines which may be of the same type of the machine described or may be of a non-weighing type which deposits in each carton a measured volume of the product being boxed. My machine may then be used to rapidly feed a small final charge of material to the cartons, the speed of the operation resulting from the small amount to be delivered and the accuracy being obtained by the small rate of delivery.

It is therefore a further object of my invention to provide a machine by means of which the speed and accuracy of filling a series of cartons may be increased.

In the drawings all views except Fig 5 illustrate the mechanism in the same phase of the cycle of operation of the machine in which the machine has just completed filling the carton to the desired weight and actuated the controls to stop the flow of material to the carton. It will be appreciated that the machine can readily be adapted to dispense any granular, flake or powdered material.

The main structural members of the machine include a base having side frame members 1 supporting a bed plate 2 and enclosed by suitable side panels 3. The bed plate 2 supports a pair of end frame members 4 which are triangular in shape and connected at their upper ends by a top cross member 5. A front closure plate 6 is provided to shield the control mechanism from dust and particles of the material being dispensed. The frame members 4 support a carton feed conveyor 7 and a carton discharge conveyor 8 on the front of the machine and a scale pan member 9 is supported between the adjacent ends of the conveyors as will be more particularly described presently. The top cross member 5 supports a hopper 10 in which the material to be dispensed is stored. The backs of the frame members 4 are provided with bearing brackets 11 rotatably supporting a drive shaft 12 and a rock shaft 13. The conveyors 7 and 8 are provided with laterally adjustable side rails 14 for guiding cartons of varying width through the machine and pulleys 15 for rotatably supporting a continuous conveyor belt 16.

An electric motor illustrated conventionally at 17 is mounted in the base and arranged to continually drive the conveyor belt in the direction indicated by the arrows. The motor is further arranged to continually rotate a driving chain 18 for continuous rotation of the drive shaft 12. Due to the relatively complex inter-relationship and cross-connected controls of the various parts of the machine, the several elements thereof will be described separately and their inter-relation later pointed out in connection with the cycle of operations of the machine.

Material dispensing apparatus

Figure 2:
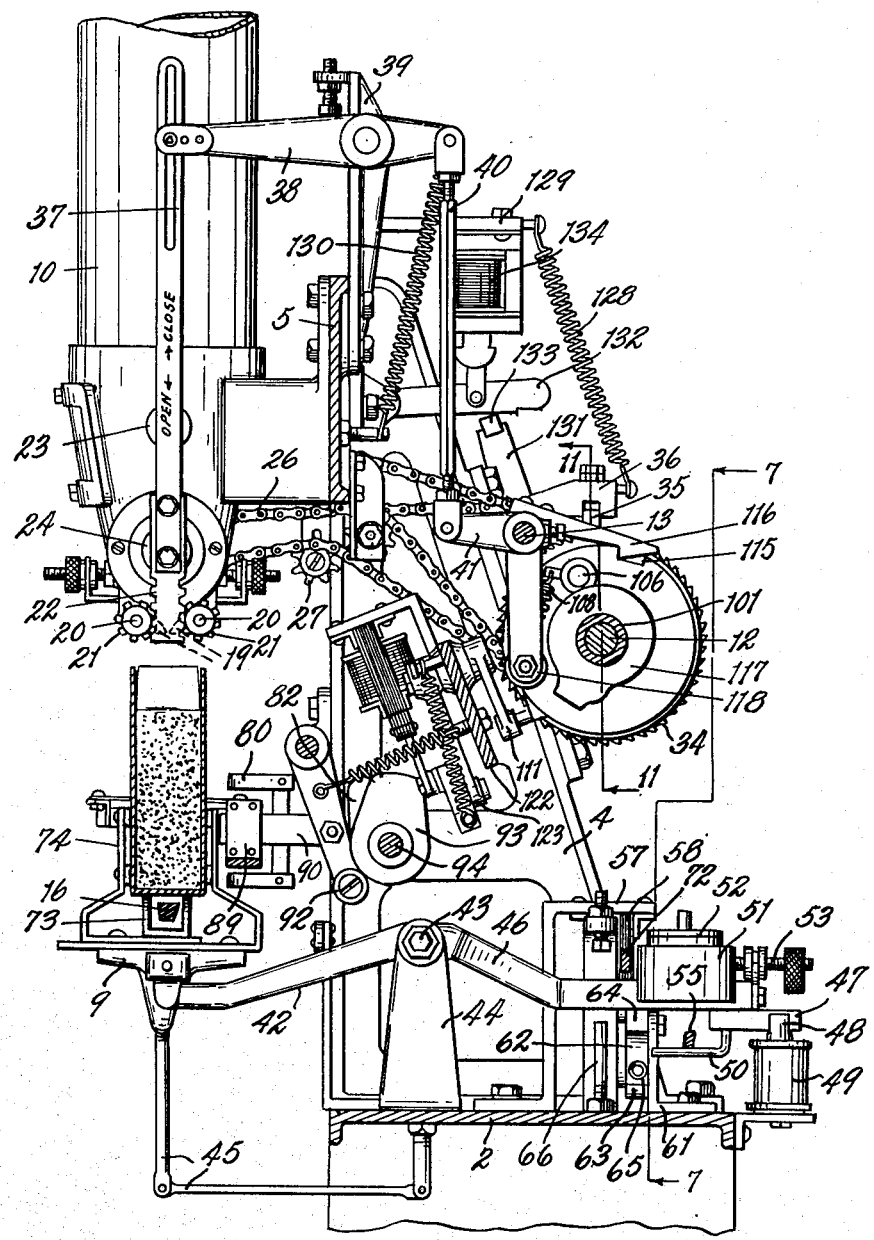
Fig. 2 is a fragmentary vertical cross sectional view along the broken line 2—2 in Fig. 1 and showing the mechanism at the completion of a filling cycle and just prior to removal of the filled carton.
Figure 3:
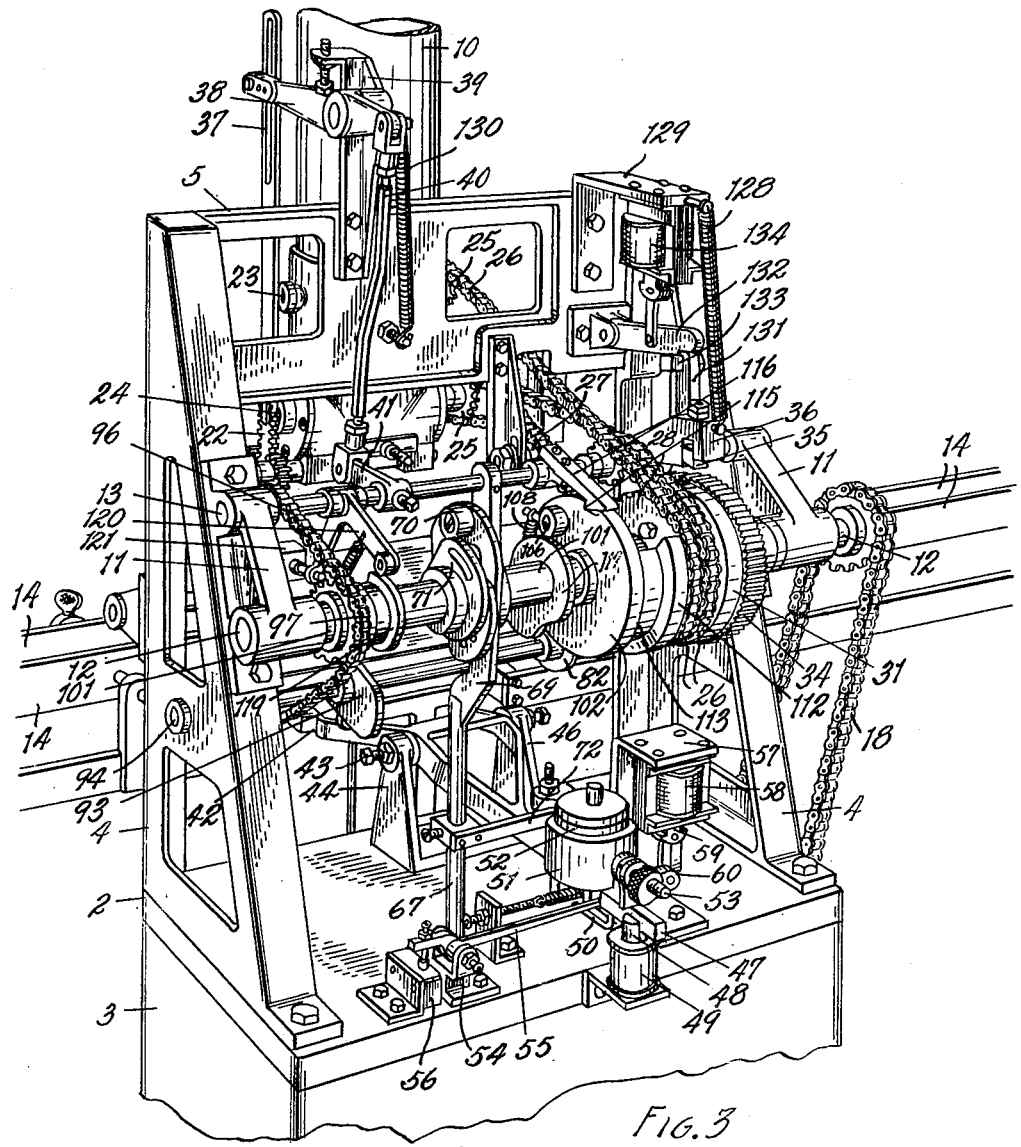
Fig. 3 is a perspective view from the rear of the machine with the front cover plate removed.

The hopper 10 is provided with a discharge spout positioned over the scale pan 9 and controlled by a pair of shutters 19 (see Fig. 2). The shutters are mounted on rock shafts 20 having pinions 21 secured to the ends thereof. The pinions mate with and are actuated by a rack 22 extending vertically alongside of the hopper. The hopper is further provided with an agitator shaft 23 and an impeller shaft 24 which are provided with suitable paddles or vanes (not shown) within the hopper to assure rapid discharge of the material being dispensed through the spout of the hopper. The shafts 23 and 24 are provided with sprockets 25 which are driven by feed chains 26. The feed chains 26 extend through appropriately located holes in the front plate 6 and over idler pulleys 27 to a pair of sprockets 28 which are freely rotatable on the drive shaft 12 (see Fig. 11).

The drive sprockets 28 are bolted or otherwise secured to a driven bevel gear 29 which is continually in mesh with the pinions 30 carried by the differential clutch sleeve 31. The pinions 30 are in constant mesh on their opposite sides with a driving bevel gear 32 which is keyed to the driving shaft as at 33 for rotation therewith. The exterior of the differential clutch sleeve 31 is provided with ratchet teeth 34 which are arranged to be engaged and held by the dog 35 adjustably mounted in the feed clutch arm 36. The feed clutch arm 36 is securely fastened to the rock shaft 13 for actuation thereby in a manner which will be more particularly described presently.

The rack 22 is provided with a slotted upper end 37 which is adjustably secured to one end of a double arm lever 38 pivotally mounted on a bracket 39 secured to the top cross member 5. The rear arm of the lever 38 is connected by means of the vertical link 40 to a shutter control arm 41 also securely fastened to the rock shaft 13.

From the foregoing description of the material feed mechanism it should be apparent that when the rock shaft 13 is rotated toward the rear of the machine or in a clockwise direction as viewed in Fig. 2, the dog 35 will be engaged with the ratchet teeth 34 on the clutch sleeve to restrain the sleeve from rotation. Forward rotation of the driving shaft and driving gear 32 will then impart rotary motion to the pinions 30 and a rearward rotation of the driven gear 29 and driving sprockets 28. This will result in rotation of the agitator shaft 23 and impeller shaft 24 to discharge material from the spout of the hopper. Concurrently with the above actuation of the feed arm 36, the shutter arm 41 will be raised to act through the link 40, lever 38 and rack 22 to open the shutters 19. Naturally a reverse or counter-clockwise rotation of the rock shaft 13 will stop the feed chains and close the shutters.

Scale pan and weighing apparatus

The scale pan 9 is supported underneath the spout of the hopper on a scale beam 42 which extends through a suitable hole in the front plate 6 to a pivotal support 43 on the bracket 44. The bracket 44 is carried on the bed plate 2 and parallel arm linkage 45 is provided to maintain the scale pan in a level position as the scale beam 42 pivots about the connection 43. The rear arm 46 of the scale beam is provided with a damper bar 47 positioned in freely movable but magnetically engaged relationship with the core 48 of a damper magnet 49. The damper bar 47 carries a forwardly extending finger 50 which is spaced below the rear arm 46 of the scale beam. The top of the arm 46 is provided with a weight cup 51 in which balance weights 52 are positioned to balance the scale pan and carton and the charge of material to be placed in the carton. A screw 53 threaded through a plate on the end of the scale beam is provided for adjusting the location of the weight pan to determine the proper balance of the scale pan and beam.

Mounted to one side of the rear arm of the scale beam is a bracket 54 pivotally supporting a switch beam 55. One arm of the switch beam 55 extends between the rear end of the scale beam and the depending finger 50 carried by the scale beam so that downward movement of the scale pan will result in upward movement of the finger 50 and the right end of the switch beam 55 as illustrated in Fig. 7. The opposite end of the switch beam is arranged to actuate and close a feed control micro-switch 56 when the scale pan is depressed. The micro-switch 56 is connected with the mechanism for stopping feed chains 26 in a manner which will be more particularly described presently.

Secured to the bed plate 2 on the opposite side of the scale beam from the micro-switch 56 is a bracket 57 supporting a carton discharge solenoid 58 which has its armature 59 link connected to a locking lever 60. The locking lever 60 is pivotally supported on a bracket 61 (see Fig. 2) which also pivotally supports a scale pan depressing crank 62. The lower arm of the crank 62 is arranged to be engaged and locked by a notch 63 in the locking lever 60. The horizontal arm 64 of the crank extends to underneath the rear arm 46 of the scale beam and is arranged to raise the rear arm of the scale beam by action of the discharge spring 65 when the locking lever 60 is released by energization of the carton discharge solenoid 58. A limit stop pin 66 adjustably secured to the bed plate 2 limits the downward motion of the rear arm 46 of the scale beam and the switch beam 55.

A scale reset rod 67 extends vertically through the bed plate 2 and is connected to a reset spring 68 as is most clearly illustrated in Fig. 7. The upper end of the reset rod 67 is provided with a hooked plate 69 embracing the drive shaft 12 and carrying a cam roller 70. The roller 70 is arranged to be actuated by a two part cam 71 to raise the reset rod against the tension of the spring 68 in a manner to be more particularly described presently. The rod 67 carries a reset bar 72 engageable with the top of the rear arm 46 of the scale beam and arranged to depress the rear arm of the scale beam when the cam roller 70 permits the reset rod to be depressed by the spring 68.

From the above description it will be apparent that the rear arm 46 of the scale beam may be raised by the increased weight of the carton and material therein and by the action of the discharge spring 65 when the discharge crank 62 is released by the locking lever 60 and energization of the carton discharge solenoid 58. Raising of the rear arm of the scale beam by either method will raise the switch beam 55 and close the micro-switch 56. The rear arm of the scale beam may be depressed to raise the scale pan by operation of the reset rod 67 and spring 68 when this action is permitted by the cams 71 and cam roller 70. It will be noted that the scale pan 9 is provided with an upwardly opened channel-shaped base member 73 which is arranged to engage the bottom of the carton in the scale pan and raise the carton off the conveyor belt 16 when the scale pan is raised. Suitable side rails 74 are provided for supporting the carton on the scale pan.

*Carton feed control mechanism*

The intake and discharge conveyors 7 and 8 are arranged to guide a series of cartons as indicated at 75 through the filling and weighing machine. The inlet conveyor 7 is provided with a pivotally mounted finger 76 (see Fig. 4) which projects between the side rails 14 and is arranged to be engaged and actuated by the cartons as they are fed through the conveyor by the belt 16. The finger 76 is arranged to actuate and close a carton feed limit switch 77 when there is an incoming carton positioned adjacent to the finger. The switch 77 is preferably of the microswitch type. Further inwardly of the intake conveyor, the outer side rail 14 is provided with a wedge-shaped offset block 78 which operates to force the incoming cartons against the rear side rail of the conveyor where they will be engaged and held by the stop 79. A kick-off plunger 80 arranged to be actuated by an arm 81 and kick-off cam 82 is provided for moving the cartons back to the center of the conveyor where they will be carried onto the scale pan by the belt. The operation of the cam 82 will be described persently.

The outlet conveyor 8 is provided with a finger 83 similar to the finger 76 which is arranged to actuate and close an outlet limit switch 84 when there is a carton on the outlet conveyor opposite the finger 83. An outlet stop bar 85 is reciprocably mounted on the rear side rail of the outlet conveyor just past the finger 83 and arranged to be slid forwardly to block the passage of cartons through the outlet conveyor by means of an arm 86 and roller 87 actuated by an outlet cam 88. When the limit bar 85 is advanced, a carton will be held in contact with the finger 83 and the limit switch 84 will be held closed.

The rear side rail of the outlet conveyor is provided with a bracket 89 at its entrance end which reciprocably supports a scale pan stop bar 90. The bar 90 is arranged to be reciprocated in the bracket 89 by an arm 91 and roller 92 actuated by the scale pan stop cam 93. When the bar 90 is advanced a carton will be held on the scale pan against the action of the conveyor belt tending to move the carton from the scale pan.

The cams 82, 88 and 93 are all non-rotatably mounted on a carton control shaft 94 having its ends journaled in the end frames 4 of the machine. The carton control shaft is arranged to be rotated by a chain 96 driven from a sprocket 97 rotatable around the drive shaft 12 as will be more particularly described presently. With particular reference to Fig. 12 it will be noted that the outlet cam 88 is provided with a relatively narrow lift portion 98 which is angularly advanced with respect to the lifts of the other two cams. The scale pan stop cam 93 is provided with a relatively broad lift 99 angularly retarded behind the outlet lift 98 and the kick-off cam 82 is provided with a relatively narrow lift 100 which is slightly advanced ahead of the scale pan stop cam but retarded behind the outlet cam.

From the above description it will be apparent that rotation of the carton control cam shaft 94 will first retract the outlet stop bar 85 permitting a filled carton to leave the outlet conveyor. At this time the scale pan stop bar will be retracted permitting the exit of a filled carton from the scale pan and the kick-off cam and bar will be retracted so that incoming cartons are backed up behind the stop 79. Further rotation of the cam shaft 94 will first actuate the kick-off bar 80 permitting one carton to enter the scale pan and immediately thereafter the scale pan stop bar 90 will be actuated in time to stop the incoming carton on the scale pan. The relationship between the carton control cam shaft and the other parts of the mechanism will be described presently.

Re-cycling mechanism

Figure 11:
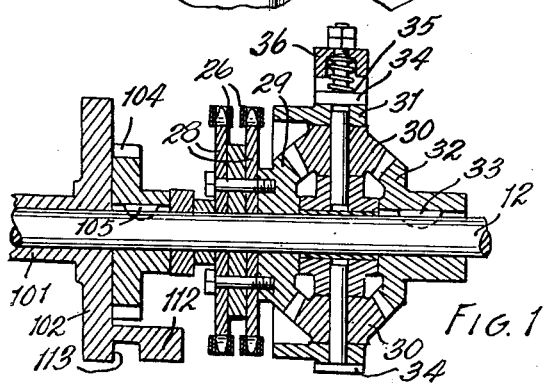
Fig. 11 is a fragmentary cross sectional view along the line 11—11 in Fig. 2.

As is most clearly illustrated in Figs. 3, 7, 8 and 11 the drive shaft 12 is provided with a sleeve 101 which is freely rotatable with respect to the shaft and positioned to the left of the ratchet wheel 104 as viewed in Figs. 7 and 11. The sleeve 101 is provided with a disk or flange 102 on one end thereof and the flange supports a reset pawl 103 (see Fig. 8) near the periphery of the flange. The pawl 103 is arranged to engage the teeth of a ratchet wheel 104 which is keyed for rotation with the drive shaft as at 105. The flange 102 also carries a pin 106, one end of which carries a finger 107 engaging the pawl 103. The other end of the pin 106 is spring urged by the spring 108 (see Fig. 2) to rotate the pin and finger to engage the pawl with the ratchet.

The opposite end of the pawl 103 is provided with a stop lug 109 (see Fig. 8) which is arranged to be engaged and held by a pin 110 carried on the end of a reset crank 111. A portion of the periphery of the flange 102 is provided with an arcuate flange 112 which is spaced from the ratchet 104 so as not to interfere with rotation of the ratchet. The outside of the arcuate flange 112 defines a cam slot 113 cooperating with the pin 110 to form a barrel cam. The cam slot 113 is provided with a wide entrance portion as is shown in Fig. 7 arranged to receive the pin 110 after the pin has been disengaged from the lug 109. The entrance portion immediately narrows as at 114 so that the pin 110 is returned to the plane of the pawl 103 and lug 109 and is engaged therewith at the completion of one revolution of the flange and sleeve.

It will thus be seen that the reset crank 111 and pin 110 may be disengaged from the lug 109 to permit the pawl 103 to engage the constantly rotating ratchet with the flange 102 so that the flange and sleeve will rotate with the drive shaft. After completing one revolution, the pin 110 will again engage the lug 109 and disconnect the flange and sleeve from the ratchet and the drive shaft. The flange 102 is provided with a notch 115 arranged to engage a pawl 116 to prevent backlash of the sleeve when it is stopped. The pawl 116 is freely pivoted on the rock shaft 13.

The sleeve 101 carries a reset cam 117 which is arranged to engage the roller of a reset arm 118 pin connected to the rock shaft 13. The sleeve 101 further carries the previously mentioned cams 71 which control the scale pan reset rod 67. The sprocket 97 which drives the carton control cam shaft 94 is also secured to the sleeve for rotation therewith and a cam 119 is carried on the sleeve and arranged to actuate one arm of a crank 120 freely pivoted on the rock shaft 13. The other arm of the crank 120 is arranged to actuate and close a scale beam damper switch 121 for energizing the previously mentioned magnet 49 associated with the rear arm of the scale beam.

The reset crank 111 (see Figs. 8 and 9) is pivotally mounted on a cross bar 122 extending between the end frames of the machine and is provided with a front arm 123 spring urged to the left in Fig. 9 to disengage the pin 110 from the lug 109. Disengagement of the pin 110 is prevented by engagement of the lug 124 in the notch of a locking lever 125. The locking lever is spring urged to locking position by a spring 126 and is link connected to a reset solenoid 127 which operates when energized to disengage the locking lever from the reset crank.

From the above description of the reset control mechanism it should be apparent that the sleeve 101 and its associated cams and sprocket will come to rest in a fixed position after one complete revolution, the barrel cam and slot 114 acting to reset the reset crank and pin to disengage the pawl 103. Energization of the reset solenoid 127 will again release the pin 110 from the pawl 103 and start the sleeve through another single revolution cycle.

The rock shaft 13 as has previously been described is non-rotatably secured to the feed clutch arm 36, shutter control arm 41 and reset arm 118. Rearward or clockwise rotation of the rockshaft, as viewed in Fig. 2, under the influence of the reset cam 117 and reset arm 118 will function to swing the feed arm 36 and pawl 35 into locking engagement with the ratchet teeth 34 on the differential feed clutch. Simultaneously the shutter control arm 41 will be raised to open the shutter of the hopper. A coil spring 128 connected between the end of the feed arm and a bracket 129 on the back of the top cross member and a second coil spring 130 connected between the rear end of the lever 38 and the back of the top cross member act to oppose this rotation of the rock shaft and to return the rock shaft in a counterclockwise direction when the lift of the reset cam 117 has passed the reset arm 118. Return movement of the rock shaft is prevented by engagement of a locking arm 131 with a notch in the free end of a trigger link 132. The locking arm 131 is non-rotatably secured to the rock shaft and carries a lug 133 engageable in the notch. The trigger lever 132 is link connected to the feed stop solenoid 134 mounted on the bracket 129 so that energization of the solenoid will raise the trigger and permit counterclockwise rotation of the rock shaft.

From the above description it will be apparent that rearward rotation of the rock shaft will engage the feed clutch dog 35 and open the hopper shutters to start the feeding operation of the machine. Engagement of the trigger 132 with the lever 131 will hold the mechanism in delivering position until the feed stop solenoid is energized.

Electrical circuit

Attention is now invited to Fig. 10 which illustrates conventionally the electrical wiring and interconnection of the various switches and solenoids of the machine. A power supply circuit is indicated at 135 and the scale beam damper magnet 49 and scale beam damper switch 121 are connected in series directly across the supply line. The scale beam switch 56 is connected in one side of the supply line and serves to control the supply of current to all of the other switches and solenoids. The carton discharge solenoid 58 is connected across the supply line just beyond the scale beam switch so that the carton discharge solenoid is controlled exclusively by the scale beam switch. The feed drive solenoid 134 is also connected directly across the circuit behind the scale beam switch 56 so as to be controlled by the scale beam switch. The carton feed limit switch 77 and the discharge limit switch 84 are connected in series in one side of the supply line behind the carton discharge solenoid and feed drive solenoid and the main reset solenoid 127 is connected across the line behind the switches 77 and 84 so that before the reset solenoid 127 can operate the scale beam switch 56, carton feed switch 77 and discharge limit switch 84 must all be closed.

Cycle of operations

Having thus far described the various parts of the mechanism the cycle of operations of the machine will be described starting with the machine in the position illustrated with a completely filled carton remaining on the scale pan and just after partial lowering of the scale pan under the influence of the weight of the filled carton. The reset sleeve 101 with its associated mechanism will be stationary and the material feed solenoid 134 and carton discharge solenoid 58 will have just been energized by closing of the scale beam switch 56. The trigger 132 will have been raised by the feed stop solenoid 134 permitting the locking lever 131 to swing to the front of the machine and the springs 129 and 130 will have rotated the rockshaft to disengage the differential clutch and lower the shutter link 40. In this position the feed chains 26 will be stopped and the shutters 19 will be closed.

Energization of the carton discharge solenoid 58 will have released the scale pan depressing crank 62 from the locking lever 60 (see Fig. 7) permitting the scale pan spring 65 to raise the rear arm of the scale beam as previously described, the finger 50 on the scale beam functioning to keep the scale beam switch 56 closed. As the scale pan is lowered by the operation of the spring 65, the newly filled carton will come to rest on the conveyor belt 16 and will be carried from the scale pan, the scale pan stop bar 90 being in retracted position.

The newly filled carton will be carried by the conveyor belt against the outlet stop bar 85 where it will actuate the finger 83 and close the outlet limit switch 84. Assuming that there is an insufficient supply of cartons 75 as illustrated in the drawings to actuate the carton feed limit switch 77, the machine will come to rest in this position because the circuit to the reset solenoid is open until the carton feed switch is closed.

Immediately upon the supply of an additional carton to the intake conveyor 7 the carton feed switch 77 will be closed thus closing all three switches 56, 77 and 84. Closing of the three series switches will energize the reset solenoid 127 to unlock the reset crank arm 123 and rotate the pin 110 (see Fig. 8) from behind the pawl 103 so that the pawl will engage the teeth of the ratchet 104 and connect the drive shaft with the sleeve 101. The sleeve 101 will then commence its one rotation cycle of operation. The sprocket 97 and chain 96 will rotate the carton control cam shaft 94 to actuate the kick-off cam, scale pan stop cam and outlet stop cam as previously described so that the newly filled carton will be released from behind the outlet limit switch and a new carton will be moved from behind the stop 79 by the kick-off lever 80 and stopped over the scale pan by the stop bar 90. The cam 71 will permit the reset rod 67 to depress the rear arm of the scale beam and re-raise the scale pan to operative position. Concurrently with the lowering of the reset rod 67 and the rear end of the scale beam the cam 119 on the reset sleeve will actuate the damper switch 121 so that the damper solenoid 49 will be energized to magnetically hold the scale pan in raised position during the period of shock of the initial filling operation.

The latter portion of rotation of the sleeve will bring the lift of the reset cam 117 into engagement with the reset arm 118 to rotate the rock shaft and engage the feed drive pawl 35 and open the shutters 19 as previously described. At this time the rear arm of the scale pan will be down so that the scale pan switch 56 will have been opened de-energizing the material feed solenoid 134 and the trigger 132 will engage the feed lever 131 and hold the rock shaft in material feeding position after the lift of the reset cam passes the reset arm to the end of its uni-rotational cycle. The final rotation of the sleeve will move the lift of cam 119 past the crank 120 to open damper switch 121.

The operation of the machine has been described in connection with an insufficient supply of cartons to actuate the carton feed limit switch 77 in order to point out the function of the outlet limit switch 84. It should be apparent that with the outlet limit switch 84 and the stop bar 85 which holds the newly filled carton in contact with the switch, the machine would start automatically upon the entrance of an adequate supply of cartons to the carton feed switch 77. On the other hand, if the limit switch 84 were removed from the circuit it would be possible for the machine to commence a resetting cycle immediately upon actuation of the scale beam switch 56 in which case the newly filled carton might not have time to clear the scale pan before the scale pan stop bar 90 was advanced thus piercing or damaging the newly filled carton.

In the usual manner of operation of the machine with an adequate supply of empty cartons, the carton feed inlet switch 77 will be closed substantially all of the time and the outlet limit switch 84 and outlet stop bar 85 will function to provide a timed delay between the closing of the scale beam switch 56 and the energization of the reset solenoid 127 during which time the scale pan will be lowered and the newly filled carton will pass completely off of the scale pan and actuate the outlet limit switch 84. Attention is called to the fact that the lift 98 of the outlet limit cam (see Fig. 12) is relatively narrow and angularly advanced on the carton control cam shaft so that the outlet stop bar 85 is retracted almost immediately upon closing of the outlet limit switch 84 and actuation of the reset sleeve 101. Actually the newly filled carton will pass from the discharge conveyor with little interference from the outlet stop bar when there is an adequate supply of new cartons in the inlet conveyor. The scale pan stop cam 93 is angularly arranged on the carton control cam shaft so as to advance the scale pan stop bar only when a new carton is being fed into the scale pan and until the pan has been lifted off of the conveyor belt 16. The stop bar 90 is retracted when the reset sleeve is at rest so as not to interfere with the discharge of the filled carton.

I have thus described a highly practical commercial embodiment of my weighing machine so that others may reproduce the same with such minor modifications as are desired without further disclosure.

Throughout the description and the following claims I have referred to the incoming cartons as empty cartons but it should be understood that I intend this term to be relative in that when the machine is used in series with other filling machines, the incoming cartons will be partly filled and "empty" only in relation to the machine under consideration and the charge of material which it will dispense.

Having thus described my invention what I claim as new and desire to secure by Letters Patent is:

1. A carton filling and weighing machine comprising a conveyor having a continuously driven conveyor belt, a scale having a pan positioned intermediate of the ends of said conveyor and arranged to lift the carton to be filled off of said belt, a scale switch associated with said scale to be closed in a predetermined loaded position of said scale, a filler spout positioned over said scale pan, an offset wedge on the inlet side of said conveyor arranged to move empty cartons laterally of said belt, a stop positioned between said wedge and said pan arranged to hold incoming cartons from entering said scale pan, an inlet limit switch arranged to be closed by incoming cartons in said conveyor, said inlet switch being located ahead of said wedge, a kick-off lever arranged to move a carton from behind said stop for entry onto said scale pan, a stop bar arranged to register the position of an unfilled carton over said scale pan, an outlet limit switch arranged to be closed by a carton on the outlet side of said conveyor, an outlet stop arranged to hold a carton in contact with said outlet limit switch, electrically controlled mechanically operated reset mechanism for raising said scale pan to carton filling position, and a cam shaft having a single rotation cycle of operation with the reset mechanism of said machine, said cam shaft having angularly spaced cams operative to successively retract said outlet stop, advance said kick-off lever and advance said scale pan stop bar and come to rest with said outlet stop advanced, said reset mechanism being electrically connected to be energized through all said switches in series.

2. A carton filling and weighing machine comprising a conveyor having a continuously driven conveyor belt, a scale having a pan positioned intermediate of the ends of said conveyor and arranged to lift the carton to be filled off of said belt, a scale switch associated with said scale to be closed in a predetermined loaded position of said scale, a filler spout positioned over said scale pan, an offset wedge on the inlet side of said conveyor arranged to move empty cartons laterally of said belt, a stop positioned between said wedge and said pan arranged to hold incoming cartons from entering said scale pan, an inlet limit switch arranged to be closed by incoming cartons in said conveyor, said inlet switch being located ahead of said wedge, a kick-off lever arranged to move a carton from behind said stop for entry onto said scale pan, an outlet limit switch arranged to be closed by a carton on the outlet side of said conveyor, an outlet stop arranged to hold a carton in contact with said outlet limit switch, electrically controlled mechanically operated reset mechanism for raising said pan to carton filling position, and a cam shaft having a single rotation cycle of operation with the reset mechanism of said machine, said cam shaft having angularly spaced cam operative to successively retract said outlet stop, advance said kick-off lever and come to rest with said outlet stop advanced, said reset mechanism being electrically connected to be energized through all said switches in series.

3. In combination with a carton filling and weighing machine having electrically started mechanically operated reset mechanism and electrically stopped filling mechanism, a conveyor having a conveyor member continuously driven in a fixed path, a scale pan positioned intermediate of the ends of said conveyor and arranged to lift the carton to be filled off of said conveyor, a scale switch positioned to be closed by said scale when the load thereon reaches a predetermined level, said scale switch being connected to energize said reset mechanism and stop said filling mechanism, a filler spout positioned over said scale pan, an offset wedge on the inlet side of said conveyor arranged to move empty cartons laterally of said conveyor, a stop arranged to hold incoming cartons from entering said scale pan, an inlet limit switch arranged to be closed by incoming cartons in said conveyor, a kick-off lever arranged to move a carton from behind said stop for entry onto said scale pan, a stop bar arranged to register an incoming carton over said scale pan, an outlet limit switch arranged to be closed by a carton on the outlet side of said conveyor, an outlet stop arranged to hold a carton in contact with said outlet limit switch, and a cam shaft having a single rotation cycle of operation with the reset mechanism of said machine, said cam shaft having angularly spaced cams operative to successively retract said outlet stop, advance said kickoff lever and advance said stop bar and come to rest with said outlet stop advanced, said reset mechanism being arranged to be started when all said switches are closed.

4. In combination with a carton filling and weighing machine having mechanically reset mechanism and electrically stopped filling mechanism, a conveyor having a conveyor member continuously driven in a fixed path, a scale pan positioned intermediate of the ends of said conveyor and arranged to lift the carton to be filled off of said conveyor, a scale switch positioned to be closed by said scale when the load thereon reaches a predetermined level, said scale switch being connected to energize said reset mechanism and stop said filling mechanism, a filler spout positioned over said scale pan, a stop arranged to hold incoming cartons from entering said scale pan, an inlet limit switch arranged to be closed by incoming cartons in said conveyor, a kick-off lever arranged to move a carton from behind said stop for entry onto said scale pan, an outlet limit switch arranged to be closed by a carton on the outlet side of said conveyor, an outlet stop arranged to hold a carton in contact with said outlet limit switch, and a cam shaft having a single rotation cycle of operation with the reset mechanism of said machine, said can shaft having angularly spaced cams operative to successively retract said outlet stop, advance said kick-off lever and come to rest with said outlet stop advanced, said reset mechanism being arranged to be started when all said switches are closed.

5. In combination with a carton filling and weighing machine having a mechanical reset and electrically stopped filling mechanism, a conveyor having a continuously driven conveyor belt, a scale pan positioned intermediate of the ends of said conveyor and arranged to lift the carton to be filled off of said belt, a scale switch arranged to be closed when said scale pan and a carton thereon reach a pre-determined weight, a filled spout positioned over said scale pan, a wedge on the inlet side of said conveyor arranged to move empty cartons laterally of said belt, a stop arranged to hold incoming cartons from entering said scale pan, an inlet limit switch arranged to be closed by incoming cartons in said conveyor, a stop bar arranged to register an incoming carton over said scale pan, an outlet limit switch arranged to be closed by a carton on the outlet side of said conveyor, an outlet stop arranged to hold a carton in contact with said outlet limit switch, and a cam shaft having a single rotation cycle of operation with the reset mechanism of said machine and arranged to successively retract said outlet stop, render said first stop inoperative, advance said scale pan stop bar and come to rest with said outlet stop advanced, said reset mechanism being arranged to be started when all said switches are closed, said filling mechanism being arranged to be stopped when said scale switch is closed.

6. In combination with a carton filling and weighing machine having a mechanical reset and electrically stopped filling mechanism, a conveyor having a continuously driven conveyor belt, a scale pan positioned intermediate of the ends of said conveyor and arranged to lift the carton to be filled off of said belt, a scale switch arranged to be closed when said scale pan and a carton thereon reach a pre-determined weight, a filler spout positioned over said scale pan, a stop arranged to hold incoming cartons from entering said scale pan, an inlet limit switch arranged to be closed by incoming cartons in said conveyor, an outlet limit switch arranged to be closed by a carton on the outlet side of said conveyor, an outlet stop arranged to hold a carton in contact with said outlet limit switch, and a cam shaft having a single rotation cycle of operation with the reset mechanism of said machine and arranged to successively retract said outlet stop, render said first stop inoperative, and come to rest with said outlet stop advanced, said reset mechanism being arranged to be started when all said switches are closed, said filling mechanism being arranged to be stopped when said scale switch is closed.

7. An automatic filling and weighing machine comprising a hopper having a shutter controlled outlet spout, a power driven impeller for feeding the material to be weighed through said spout, a scale pan positioned under said spout, a constantly rotating driving shaft, a clutch connectable between said drive shaft and said impeller to drive said impeller from said drive shaft, a resetting sleeve rotatable relative to said drive shaft, a solenoid controlled pawl for rotatably engaging said sleeve with said drive shaft, a cam rotatable with said sleeve and operative on said pawl for disengaging said sleeve from said shaft at the completion of one revolution of said sleeve, a rock shaft cam-actuated from said sleeve and having feed arms thereon positioned to open the shutters of said spout and engage said clutch in driving position, a spring connected to return said rock shaft to clutch disengaging and shutter closing position, a solenoid controlled trigger positioned to hold said rock shaft in clutch engaging and shutter opening position, a switch actuated by said scale pan connected to energize the solenoid of said trigger and release said rock shaft, and means including said switch electrically connected to energize the solenoid of said pawl to move said pawl to sleeve driving position.

8. An automatic filling and weighting machine comprising a hopper having an outlet spout, a power driven impeller for feeding the material to be weighed through said spout, a scale pan positioned under said spout, a constantly rotating driving shaft, a clutch connectable between said drive shaft and said impeller to drive said impeller from said drive shaft, a resetting sleeve rotatable relative to said drive shaft, a solenoid controlled pawl for rotatably engaging said sleeve with said drive shaft, a cam rotatable with said sleeve and operative on said pawl for disengaging said sleeve from said shaft at the completion of one revolution of said sleeve, a rock shaft cam-actuated from said sleeve and having a feed arm thereon positioned to engage said clutch in driving position, a spring connected to return said rock shaft to clutch disengaging position, a solenoid controlled trigger positioned to hold said rock shaft in clutch engaging position, a switch actuated by said scale pan connected to energize the solenoid of said trigger and release said rock shaft, and means including said switch electrically connected to energize the solenoid of said pawl to move said pawl to sleeve driving position.

9. An automatic filling and weighing machine comprising a hopper having a shutter controlled outlet spout, a scale pan positioned under said spout, a constantly rotating driving shaft, a resetting sleeve rotatable relative to said drive shaft, a solenoid controlled pawl for engaging said sleeve for rotation by said drive shaft, a cam rotatable with said sleeve and operative on said pawl for disengaging said sleeve from said shaft at the completion of one revolution of said sleeve, a rock shaft cam-actuated from said sleeve and having a feed arm thereon positioned to open the shutters of said spout, a spring connected to return said rock shaft to shutter closing position, a solenoid controlled trigger positioned to hold said rock shaft in shutter opening position, a switch actuated by said scale pan connected to energize the solenoid of said trigger and release said rock shaft, and means including said switch electrically connected to energize the solenoid of said pawl to move said pawl to sleeve driving position.

10. An automatic filling and weighing machine comprising a hopper having a shutter controlled spout, a rock shaft connected to open and close said shutter, a uni-rotational reset member having a cam arranged to move said rock shaft to shutter opening position, a reset solenoid arranged to actuate said reset member, a spring connected to return said rock shaft to shutter closing position, a trigger engageable with said rock shaft to oppose the action of said spring, a feed stop solenoid arranged to disengage said trigger, a scale pan for supporting a carton to be filled under said spout, a scale beam for supporting said scale pan, and a switch positioned to be closed by said scale beam when the weighing of said carton reaches a pre-determined amount, said switch being electrically connected to energize said reset solenoid and feed stop solenoid.

11. An automatic filling and weighing machine comprising a hopper having a shutter controlled spout, a rock shaft connected to open and close said shutter, a uni-rotational reset member having a cam arranged to move said rock shaft to shutter opening position, a reset solenoid arranged to actuate said reset member, a spring connected to return said rock shaft to shutter closing position, a trigger engageable with said rock shaft to oppose the action of said spring, a feed stop solenoid arranged to disengage said trigger, a scale pan for supporting a carton to be filled under said spout, a scale beam for supporting said scale pan, a pan resetting member cam operated from said reset member and engageable with said beam to elevate said pan to weighing position, and a switch positioned to be closed by said scale beam when the weight of said carton reaches a pre-determined amount, said switch being electrically connected to energize said reset solenoid and feed stop solenoid.

12. An automatic filling and weighing machine comprising a hopper having a shutter controlled spout, a rock shaft connected to open and close said shutter, a uni-rotational reset member having a cam arranged to move said rock shaft to shutter opening position, a reset solenoid arranged to actuate said reset member, a spring connected to return said rock shaft to shutter closing position, a trigger engageable with said rock shaft to oppose the action of said spring, a feed stop solenoid arranged to disengage said trigger, a scale pan for supporting a carton to be filled under said spout, a scale beam for supporting said scale pan, a carton feed control member driven from said reset member, and a switch positioned to be closed by said scale beam when the weight of said carton reaches a pre-determined amount, said switch being electrically connected to energize said reset solenoid and feed stop solenoid.

13. An automatic filling and weighing machine comprising a hopper having a shutter controlled spout, a rock shaft connected to open and close said shutter, a uni-rotational reset member having a cam arranged to move said rock shaft to shutter opening position, a reset solenoid arranged to actuate said reset member, a spring connected to return said rock shaft to shutter closing position, a trigger engageable with said rock shaft to oppose the action of said spring, a feed stop solenoid arranged to disengage said trigger, a scale pan for supporting a carton to be filled under said spout, a scale beam for supporting said scale pan, a magnet for stabilizing said beam in pan raising position, a switch cam-operated by said reset member and electrically connected to energize said magnet during part of the rotational cycle of said reset member, a switch positioned to be closed by said scale beam when the weight of said carton reaches a pre-determined amount, said switch being electrically connected to energize said reset solenoid and feed stop solenoid.

14. In a carton filling and weighing machine having a weighing scale, material feeding apparatus positioned over said scale and a constantly driven drive shaft, mechanism for resetting the scale and feeding apparatus to weighing and feeding position after the filling and discharge of a carton comprising a sleeve positioned around said shaft and having a flange on one end thereof, a ratchet member secured to said shaft and adjacent to said flange, a pawl pivotally mounted on said flange and spring urged toward engagement with said ratchet, a disengaging lug on said pawl, a reset crank pivotally mounted on said machine and having a pin engageable with said lug to disengage said pawl from said ratchet, a spring urging said crank out of engagement with said lug, a locking lever engageable with said crank to prevent disengagement of said pin from said lug, a solenoid arranged to disengage said locking lever from said crank, a cam slot on said flange engageable with said pin upon rotation of said flange to re-engage said pin with said lug after one rotation of said sleeve, a switch positioned to be closed by depression of said scale, a power supply circuit connected to energize said solenoid and including in series switches positioned to be closed by a pre-determined positioning of cartons in said machine and said scale switch, and means actuated by rotation of said sleeve for resetting said scale and said feeding apparatus.

15. In a carton filling and weighing machine having a weighing scale, material feeding apparatus and a constantly driven drive shaft, mechanism for resetting the scale and feeding apparatus to weighing and feeding position after the filling and discharge of a carton comprising a sleeve positioned around said shaft and having a flange on one end thereof, a ratchet member secured to said shaft and adjacent to said flange, a pawl pivotally mounted on said flange and spring urged toward engagement with said ratchet, a disengaging lug on said pawl, a reset crank pivotally mounted on said machine and having a pin engageable with said lug to disengage said pawl from said ratchet, a spring urging said crank and pin out of engagement with said lug, a locking lever engageable with said crank to prevent disengagement of said pin from said lug, a solenoid arranged to disengage said locking lever from said crank, a cam slot on said flange engageable with said pin upon rotation of said flange to re-engage said pin with said lug after one rotation of said sleeve, a power supply circuit connected to energize said solenoid and including in series switches positioned to be closed by a pre-determined positioning of cartons in said machine, and means actuated by rotation of said sleeve for resetting said scale and said feeding apparatus.

16. In a carton filling and weighing machine having a weighing scale, material feeding apparatus and a constantly driven drive shaft, comprising a sleeve positioned around said shaft and having a flange on one end thereof, a ratchet member secured to said shaft and adjacent to said flange, a pawl pivotally mounted on said flange and spring urged toward engagement with said ratchet, a disengaging lug on said pawl, a reset arm pivotally mounted on said machine and having a pin engageable with said lug to disengage said pawl from said ratchet, a spring urging said arm and pin out of engagement with said lug, a locking lever engageable with said arm to prevent disengagement of said pin from said lug, a solenoid arranged to disengage said locking lever from said arm, a cam surface on said flange engageable with said pin upon rotation of said flange to re-engage said pin with said lug after one rotation of said sleeve, and means actuated by rotation of said sleeve for resetting said scale and said feeding apparatus.

17. In a filling and weighing machine having carton filling mechanism, carton weighing mechanism, carton locating mechanism, and a constantly driven drive shaft, means for resetting said mechanisms to their initial operating positions after the filling, weighing and discharge of a filled carton comprising a rotary member, a clutch member carried by said rotary member for engaging said rotary member with said shaft for rotation thereby, spring means for engaging said clutch member with said shaft, a solenoid controlled lock member engageable with said clutch member to prevent the operation of said spring means and swingable out of engagement with said clutch member when actuated by its solenoid, a cam member carried by said rotary member and engageable with said lock member to re-engage said lock member with said clutch member after one revolution of said rotary member, and means including cams on said rotary member for resetting the filling mechanism and weighing mechanism and carton locating mechanism of said machine.

18. In a filling and weighing machine having carton filling mechanism, carton locating mechanism, and a constantly driven drive shaft, means for resetting said mechanisms to their initial carton filling and locating position after the filling and discharge of a full carton comprising a rotary member, a clutch member carried by said rotary member for engaging said rotary member with said shaft for rotation thereby, spring means for engaging said clutch member with said shaft, a solenoid controlled lock member engageable with said clutch member to prevent the operation of said spring means and swingable out of engagement with said clutch member when actuated by its solenoid, a cam rotatable with said rotary member and engageable with said lock member to re-engage said lock member with said clutch member, and means including cams on said rotary member for actuating the filling mechanism and carton locating mechanism of said machine.

19. In a filling and weighing machine having carton filling mechanism, carton weighing mechanism, and a constantly driven drive shaft, means for resetting said mechanisms after the filling and weighing of a prior carton comprising a rotary member, a clutch member carried by said rotary member for engaging said rotary member with said shaft for rotation thereby, spring means for engaging said clutch member with said shaft, a solenoid controlled lock member preventing the operation of said spring means, and means including a cam rotatable with said rotary member and engageable with said lock member to re-engage said lock member with said clutch member.

20. Scale structure for an automatic filling and weighing machine having a continuously moving conveyor belt, comprising a pan member having an upwardly opening channel-shaped base arranged to embrace said belt and lift a carton to be filled off of said belt, a pivoted scale beam supporting said pan and having a balance arm on the opposite side of its pivot from said pan, a switch beam pivotally mounted on said machine and having one arm arranged to be actuated by said balance arm, said switch beam being arranged to close a switch upon lowering of said scale pan to a position corresponding to a predetermined weight, a spring urged member arranged to raise said balance arm to depress said pan member further than said predetermined position and below said belt, a locking member for preventing the operation of said spring urged member, a solenoid for disengaging said locking member, said solenoid being arranged to be actuated by the closing of said switch, and a scale reset member arranged to depress said balance beam and reset said spring urged member.

21. Scale structure for an automatic filling and weighing machine having a continuously moving conveyor belt, comprising a pan member having an upwardly opening channel-shaped base arranged to embrace said belt and lift a carton to be filled off of said belt, a pivoted scale beam supporting said pan and having a balance arm on the opposite side of its pivot from said pan, a switch mounted on said machine arranged to be actuated by said balance arm, said switch being arranged to close upon lowering of said scale pan to a position corresponding to a predetermined weight, a spring urged member arranged to raise said balance arm to depress said pan member further than said predetermined position and below said belt, a locking member for preventing the operation of said spring urged member, and a solenoid for disengaging said locking member, said solenoid being arranged to be actuated by the closing of said switch.

22. An automatic filling and weighing machine comprising a hopper for an unweighed bulk supply of material and having a shutter controlled feed opening, a continuously movable conveyor for moving cartons past said opening, a carton control member for controlling the movement of cartons on said conveyer, a constantly rotating driving member, an intermittently operating reset member, said carton control member being operated by said reset member, a solenoid controlled clutch member for engaging said reset member with said driving member, a feed control member spring urged to no-feed position arranged to open the shutter of said feed opening upon actuation by said reset member, a solenoid controlled trigger member for holding said feed control member in shutter opening position, a scale for supporting a carton beneath said opening and off of said conveyer, a switch arranged to be operated by said scale and connected to actuate said solenoid controlled members, and a scale pan reset member cam controlled by said intermittently operating rest member and arranged to move said scale to switch opening position.

23. An automatic filling and weighing machine comprising a hopper for an unweighed bulk supply of material and having a shutter controlled feed opening, a continuously movable conveyor for moving cartons past said opening, a constantly rotating driving member, an intermittently operating reset member, a solenoid controlled clutch member for engaging said reset member with said driving member, a feed control member spring urged to no-feed position arranged to open the shutter of said feed opening upon actuation by said reset member, a solenoid controlled trigger member for holding said feed control member in shutter opening position, a scale for supporting a carton beneath said shutter opening, a switch arranged to be operated by said scale and connected to actuate said solenoid controlled members, and a scale reset member controlled from said intermittently operating reset member and arranged to move said scale to switch opening position.

24. An automatic filling and weighing machine comprising a hopper for an unweighed bulk supply of material and having a feed opening, a continuously movable conveyor for moving cartons past said opening, a constantly rotating driving member, an intermittently operating reset member, a solenoid controlled clutch member for engaging said reset member with said driving member, a feed control member arranged to open said feed opening upon actuation by said reset member, a solenoid controlled trigger member for holding said feed control member in feeding position, a scale for supporting a carton beneath said opening, and a switch arranged to be operated by said scale and connected to actuate said solenoid controlled members.

25. In an automatic filling and weighing machine having a scale, a power supply circuit, a scale damper magnet and switch connected in series and across said supply circuit, a scale switch, carton outlet switch and carton inlet switch interposed in series in one side of said supply circuit and beyond said damper magnet circuit, said scale switch being positioned to be actuated when said scale reaches a predetermined loaded position, a feed control solenoid for stopping the feed of material being weighed and carton discharge solenoid, said solenoids being connected in parallel across said supply circuit and between said scale switch and said other switches whereby said feed control solenoid and carton control solenoid are energized by closing said scale switch and a reset solenoid for energizing the resetting mechanism of said machine interposed in said supply circuit and in series with said three switches whereby all said switches must be closed at the same time before said reset solenoid is energized.

26. An electrical control circuit for an automatic filling and weighing machine comprising a power supply circuit, a scale switch, carton outlet switch and carton inlet switch interposed in series in one side of said supply circuit, a feed control solenoid and carton discharge solenoid connected in parallel across said supply circuit and between said scale switch and said other switches whereby said feed control solenoid and carton control solenoid are energized by closing said scale switch, and a reset solenoid for energizing the resetting mechanism of said machine interposed in said supply circuit and in series with said three switches whereby all said switches must be closed at the same time before said reset solenoid is energized.

27. An electrical control circuit for an automatic filling and weighing machine comprising a power supply circuit, a scale switch and carton inlet switch interposed in series in one side of said supply circuit, a feed control solenoid and carton discharge solenoid connected in parallel across said supply circuit and between said scale switch and said other switch whereby said feed control solenoid and carton control solenoid are energized by closing said scale switch, and a reset solenoid for energizing the resetting mechanism of said machine interposed in said supply circuit and in series with said two switches whereby all said switches must be closed at the same time before said reset solenoid is energized.

28. A filling and weighing machine including a conveyor comprising an endless belt continuously driven in a fixed path and ways operatively associated therewith and along which containers are translated by the frictional engagement of the belt therewith, said ways comprising spaced feed and delivery sections, the belt extending between the adjacent ends of said sections, a scale having a pan disposed between the adjacent ends of said sections and comprising spaced bottom members disposed on opposite sides of the belt, side members on said pan adapted to receive the containers between them, the container being lifted from frictional driving engagement with the belt when the scale pan is in elevated position and re-engaged therewith when the scale pan is in actuated lowered position, feed means positioned and actuable to deliver to a container on the scale pan when the scale pan is in elevated position, means for cutting off the feed means and lowering said pan below said conveyor in response to a predetermined weighted deflection of said scale, means for elevating said pan timed with the exit of a filled carton from the pan, and means for turning on the feed means timed with the raising of the scale pan.

29. A filling and weighing machine including a conveyor comprising an endless belt continuously driven in a fixed path and ways operatively associated therewith and along which containers are translated by the frictional engagement of the belt therewith, said ways comprising spaced feed and delivery sections, the belt extending between the adjacent ends of said sections, a scale having a pan disposed between the adjacent ends of said sections, the container being lifted from frictional driving engagement with the belt when the scale pan is in elevated position and re-engaged therewith when the scale pan is in actuated lowered position, feed means positioned and actuable to deliver to a container on the scale pan when the scale pan is in elevated position, means for cutting off the feed means and lowering said pan below said conveyor in response to a predetermined weighted deflection of said scale, means for elevating said pan timed with the exit of a filled carton from the pan, and means for turning the feed means timed with the raising of the scale pan.

30. An automatic filling and weighing machine comprising feed means, a scale, means actuated by movement of said scale to a predetermined loaded position to stop said feed means, a conveyor for translating containers to and from said feed means and comprising fixed conveyor ways, and a continuously driven conveyor belt operatively associated therewith to frictionally engage and translate containers along the ways, said scale including a scale pan comprising upwardly facing bottom members disposed on opposite sides of the belt and adapted when the scale pan is in elevated position to lift a container from frictional driving engagement with the belt while the container is in material receiving position relative to said feed means, filled carton discharge means actuated when the scale pan is lowered as a result of the weight of the material delivered to the container and engageable with said scale to further depress said pan and cause the filled carton to be re-engaged with said belt and means for elevating said pan above said belt and for turning on said feed means in timed relation to actuation of said carton discharge means.

31. An automatic filling and weighing machine comprising feed means, a scale, means actuated by movement of said scale to a predetermined loaded position to stop said feed means, a conveyor for translating containers to and from said feed means and comprising conveyor ways, and a continuously driven conveyor belt operatively associated therewith to frictionally engage and translate containers along the ways, said scale including a scale pan adapted when the scale pan is in elevated position to lift a container from frictional driving engagement with the belt while the container is in material receiving position relative to said feed means, filled carton discharge means actuated when the scale pan is lowered as a result of the weight of the material delivered to the container and engageable with said scale to further depress said pan and cause the filled carton to be re-engaged with said belt, and means for elevating said pan above said belt and for turning on said feed means in timed relation to actuation of said carton discharge means.

32. An automatic filling and weighing machine comprising a continuously driven conveyor member arranged to move cartons through said machine, a continuously driven drive shaft, a scale pan and beam arranged to lift cartons off of said conveyor at a weighing station, a hopper having a shutter controlled spout positioned over said scale pan, power driven impellers for discharging material from said hopper through said spout, a clutch drivingly connecting said impellers to said drive shaft, a sleeve rotatably mounted on said drive shaft, a ratchet wheel keyed to said drive shaft and positioned adjacent to said sleeve, a pawl carried by said sleeve and spring urged toward engagement with said ratchet wheel to rotatably connect said sleeve to said shaft, a reset crank having a fixed pivot transverse to said drive shaft and one arm swingable into the path of said pawl to disengage said pawl from said ratchet wheel, a segmental arcuate cam surface on said sleeve and extending axially of said shaft to pick up said one arm when said arm is disengaged from said pawl and move said arm into re-engagement with said pawl after one revolution of said sleeve, means including a reset solenoid operatively engageable with said crank to disengage said arm from said pawl, a rock shaft journalled in said machine, a feed drive arm rotatable with said rock shaft and engageable with said clutch to control said clutch, a shutter control arm rotatable with said rock shaft and connected to said shutters to control the same, a reset arm on said rock shaft, a reset cam on said sleeve positioned to engage and actuate said reset arm to rotate said rock shaft to reset clutch engaging and shutter opening position, a locking arm secured to said rock shaft, a trigger engageable with said locking arm to hold said rock shaft in reset clutch engaging position, a feed control solenoid magnetically connected to disengage said trigger from said locking arm, a spring urging said rock shaft to disengage said clutch, a switch positioned to be actuated by said scale beam and electrically connected to energize said feed control solenoid when the weight of a carton being filled has reached a predetermined amount, a scale beam reset rod spring urged to engage said beam and elevate said scale pan to weighing position, a cam on said sleeve engageable with said reset rod to control the action thereof, a spring urged crank having an arm engageable with said beam to lower said scale pan below the level of said conveyor to permit the discharge of a full carton from the pan, a carton discharge control solenoid, a lock member biased toward locking engagement with said spring urged crank to prevent actuation thereof, said discharge solenoid being connected to said lock member and operative to release the same from said crank, limit switches located on the inlet and outlet side of said conveyor belt and positioned to be closed by cartons located adjacent thereto on said conveyor, said limit switches being electrically connected in series with said scale switch, a carton control cam shaft driven from said sleeve, means including an outlet drop cam on said cam shaft and movable across said conveyor to hold a carton in engagement with said outlet limit switch, means including a scale pan stop cam on said cam shaft and movable across said conveyor to stop a carton over said scale pan, means including a carton inlet control cam on said cam shaft and movable transversely of said conveyor to permit said conveyor to introduce an unfilled carton to said scale pan, a magnet positioned to stabilize said scale beam in the raised position of said scale pan, and a switch cam operated from said sleeve for energizing said magnet during part of the rotation of said sleeve.

33. An automatic filling and weighing machine comprising a continuously driven belt arranged to move cartons through said machine, a continuously driven drive shaft, a scale pan and beam positioned to lift cartons off said belt at a weighing station, a hopper having a shutter controlled spout positioned over said pan, a power driven impeller for discharging material through said spout, a clutch drivingly connecting said impeller to said drive shaft, a rotatable sleeve having a flange on one end thereof and coaxially mounted around said drive shaft, a ratchet wheel rotatable with said drive shaft and adjacent to said flange, a pawl carried by said flange and spring urged toward engagement with said ratchet wheel to rotatably connect said sleeve to said shaft, a reset crank pivotally supported adjacent to said flange and having an arm swingable into engagement with said pawl to disengage said pawl from said ratchet, a barrel cam on said flange engageable with said crank to move the same to re-engage said arm with said pawl after one revolution of said sleeve, a reset control solenoid operatively connected to said crank to disengage said arm from said pawl, a rock shaft, a feed drive arm on said rock shaft and rotatable into engagement with said clutch to control said clutch, a shutter control arm on said rock shaft and rotatable therewith, said arm being connected to said shutter to control said shutter, a reset arm on said rock shaft, a reset cam on said sleeve positioned to actuate said reset arm to oscillate said rock shaft to reset clutch engaging and shutter opening position, a locking arm secured to said rock shaft, a trigger engageable with said locking arm to hold said rock shaft in reset position, a feed control solenoid magnetically connected to said trigger to disengage said trigger from said locking arm, a spring urging said rock shaft to disengage said clutch, a switch positioned to be actuated by said scale beam and electrically connected to energize said feed control solenoid when the weight of a carton on said pan has reached a predetermined amount, a scale beam reset rod spring biased to engage said beam and elevate said pan to weighing position, a cam on said sleeve engageable with said reset rod to control the action thereof, a spring biased member engageable with said beam to lower said pan below said belt to permit the removal of a full carton from the pan by the belt, a carton discharge control solenoid, a lock member lockingly engageable with said spring urged member to prevent actuation thereof, said discharge solenoid being operatively connected to said lock member to release the same, limit switches on the inlet and outlet sides of said conveyor belt and positioned to be closed by cartons located adjacent thereto on said conveyor, the limit switch on the inlet side being spaced more than the width of one carton from said scale pan, said limit switches being electrically connected in series with said scale switch, said reset solenoid being electrically connected in series with all said switches, said carton discharge solenoid being electrically connected in series with said scale switch and ahead of said limit switches, a carton control cam shaft driven from said sleeve, means including an outlet stop cam on said cam shaft and movable transversely of the conveyor to hold a carton in engagement with said outlet limit switch, means including a kick-off cam on said cam shaft and movable transversely of the conveyor to permit said conveyor to introduce an unfilled carton into said scale pan, a magnet positioned to attract and stabilize said scale beam in the raised position of said pan, and a switch cam operated from said sleeve for energizing said magnet during part of the rotation of said sleeve.

34. An automatic filling and weighing machine comprising a continuously driven belt arranged to move cartons through said machine, a continuously driven drive shaft, a scale pan and beam positioned to lift cartons off said belt at a weighing station, a hopper having a shutter controlled spout positioned over said pan, a power driven impeller for discharging material through said spout, a clutch drivingly connecting said impeller to said drive shaft, a rotatable sleeve having a flange on one end thereof and coaxially mounted with respect to said drive shaft, a ratchet wheel rotatable with said drive shaft adjacent to said flange, a pawl carried by said flange and spring urged toward engagement with said ratchet wheel to rotatably connect said sleeve to said shaft, a reset crank pivotally supported adjacent to said flange and having an arm swingable into engagement with said pawl to disengage said pawl from said ratchet wheel, a barrel cam on said flange positioned to engage said arm and move the same into re-engagement with said pawl, a reset solenoid connected to said crank and operative to disenage said arm from said pawl, a rock shaft, a feed drive arm on said rock shaft and rotatable therewith into engagement with said clutch to control said clutch, a shutter control arm on said rock shaft and rotatable therewith, said shutter control arm being connected to open and close said shutter, a reset arm on said rock shaft, a reset cam on said sleeve positioned to engage and move said reset arm to rotate said rock shaft to reset shutter opening position, a locking arm on said rock shaft, a trigger engageable with said locking arm to hold said rock shaft in reset position, a feed control solenoid operatively connected to said trigger to disengage the same from said locking arm, means urging said rock shaft toward shutter closing position, a switch positioned to be closed by said scale beam and electrically connected to energize said feed control solenoid when the weight of a carton being filled has reached a predetermined amount, a scale beam reset rod spring urged toward engagement with said beam to elevate said pan to weighing position, a cam on said sleeve engageable with said reset rod to control the action of the latter, a spring urged member engageable with said beam to lower said pan below said belt, a carton discharge control solenoid, a lock member engageable with said spring urged member to prevent actuation thereof, said carton discharge control solenoid being operatively connected to retract said lock member, limit switches on the inlet and outlet sides of said belt and positioned to be closed by cartons located adjacent thereto on said belt, said limit switches being electrically connected in series with said scale switch, said reset solenoid being electrically connected in series with all said switches, said carton discharge solenoid being electrically connected in series with said scale switch and ahead of said limit switches, a carton control cam shaft driven from said sleeve, means including an outlet stop cam on said cam shaft and movable transversely of said belt to hold a carton in engagement with said outlet limit switch, and means including an inlet control cam on said cam shaft movable transversely of said belt to permit said belt to introduce an unfilled carton to said scale pan.

35. An automatic filling and weighing machine comprising a continuously driven conveyor arranged to move cartons through said machine, a continuously driven drive shaft, a scale pan and beam positioned to lift cartons off of said conveyor at a weighing station, a hopper having a shutter controlled spout positioned over said pan, a power driven impeller positioned to discharge material through said spout, a clutch drivingly connecting said impeller to said drive shaft, a sleeve rotatable on said shaft, a ratchet wheel keyed to said shaft adjacent to said sleeve, a pawl carried by said sleeve and spring urged toward engagement with said ratchet wheel to connect said sleeve to said shaft, a reset crank on said machine swingable into engagement with said pawl to disengage said pawl from said ratchet wheel, a cam surface on said sleeve positioned to engage said crank and move the same into re-engagement with said pawl after one revolution of said sleeve, means including a reset solenoid connected to disengage said crank from said pawl, a rock shaft, a feed drive arm rotatable with said rock shaft and engageable with said clutch to control the same, a shutter control arm rotatable with said rock shaft and connected to the shutter of said spout to control the same, a reset arm on said rock shaft, a reset cam on said sleeve positioned to actuate said reset arm and rotate said rock shaft to reset clutch engaging and shutter opening position, a locking arm secured to said rock shaft, a trigger engageable with said locking arm to hold said rock shaft in reset position, a feed control solenoid operatively connected to said trigger to retract the same from said locking arm, a spring urging said rock shaft away from reset position, a switch positioned to be actuated by said scale beam and electrically connected to energize said feed control solenoid when the weight of a carton being filled has reached a predetermined amount, a scale beam reset rod spring urged to engage said beam and elevate said pan to weighing position, a cam on said sleeve engageable with said reset rod to control the action thereof, a spring urged crank positioned to engage said beam and lower feed pan below the level of said conveyor, a lock member engageable with said spring urged crank to prevent the actuation thereof by its spring, a carton discharge control solenoid operatively connected to said lock member to release the same from said spring urged crank, and limit switches on the inlet and outlet sides of said conveyor and positioned to be closed by cartons located adjacent thereto on said conveyor, said limit switches being electrically connected in series with said scale switch, said reset solenoid being electrically connected in series with all said switches, said carton discharge solenoid being electrically connected in series with said scale switch.

36. An automatic filling and weighing machine comprising a continuously driven conveyor, a continuously driven drive shaft, a scale pan and beam positioned to lift cartons off said conveyor at a weighing station, a hopper having a spout positioned over said pan, a driven impeller positioned to discharge material from said spout, a clutch disengageably connecting said impeller to said shaft, a reset member rotatably mounted on said machine, a second clutch member disengageably connecting said reset member to said shaft and spring urged to engaged position, a catch engageable with said second clutch member to hold said second clutch member in disengaged position and spring urged toward disengagement from said second clutch member, a lock member engageable with said catch to prevent movement thereof to release said second clutch member, a reset solenoid mechanically connected to unlatch said lock member from said catch, a cam rotatable by said reset member and engageable with said catch in the disengaged position thereof to re-engage said catch with said second clutch member and said lock member, a rock shaft journalled in said machine, a feed drive arm on said rock shaft and swingable thereby into engagement with said first clutch to engage said first clutch, a shutter in said spout, a shutter arm on said rock shaft connected to said shutter, a reset arm on said rock shaft and cam actuated from said reset member to move said shutter arm and said feed drive arm to feeding position, a spring urging said rock shaft to stop feed position, a trigger positioned to engage and hold said rock shaft in feeding position, a feed control solenoid mechanically connected to disengage said trigger from said rock shaft, a scale switch positioned to be closed upon lowering of said pan and electrically connected to actuate said feed control solenoid, a carton discharge member spring urged to engage said beam and lower said pan below said conveyor, a second lock member engageable with said discharge member to prevent actuation thereof, a carton discharge solenoid mechanically connected to said second lock member to release the same from said discharge member, said carton discharge solenoid being electrically connected to be energized by closing said scale switch, a scale beam reset rod cam actuated from said reset member and engageable with said beam to elevate said pan, limit switches on the inlet and outlet sides of said conveyor and positioned to be closed by cartons located adjacent thereto on said conveyor, said limit switches being electrically connected in series with said scale switch, said reset solenoid being electrically connected in series with all said switches, a carton control cam shaft driven from said reset member, means including an outlet stop cam on said cam shaft and extensible transversely of said conveyor to hold a carton in contact with said outlet limit switch, means including a carton inlet cam on said cam shaft and extensible transversely of said conveyor to admit a single carton to said pan, means including a scale pan stop cam on said cam shaft and extensible transversely of said conveyor to hold a carton on said pan, a magnet positioned to attract and stabilize said beam in pan raised position, and a switch cam operated by said reset member and electrically connected to energize said magnet during part of the rotational cycle of said reset member.

37. An automatic filling and weighing machine comprising a continuously driven conveyor, a continuously driven drive shaft, a scale pan and beam positioned to lift cartons off said conveyor at a weighing station, a hopper having a spout positioned over said pan, a reset member rotatably mounted on said machine, a clutch member disengageably connecting said reset member to said shaft and spring urged to engaged position, a catch engageable with said clutch member to hold the same in disengaged position and spring urged toward disengagement from said clutch member, a lock member engageable with said catch to oppose the release of said clutch member by said catch, a reset solenoid mechanically connected to release said lock member from said catch member, a cam rotatable by said reset member and engageable with said catch in the disengaged position thereof to re-engage the catch with said clutch member, a rock shaft journalled in said machine, a shutter in said spout, a shutter control arm on said rock shaft and connected to said shutter, a reset arm on said rock shaft and cam controlled from said reset member to move said shutter arm to feeding position, a spring urging said rock shaft to stop feed position, a trigger positioned to engage and hold said rock shaft in feeding position, a feed control solenoid mechanically connected to disengage said trigger from said rock shaft, a scale switch positioned to be closed upon lowering of said pan and electrically connected to actuate said feed control solenoid, a carton discharge member spring urged to engage said beam and lower said pan below said conveyor, a second lock member engageable with said discharge member to prevent actuation thereof, a carton discharge solenoid mechanically connected to said second lock member to move the same from said discharge member, said carton discharge solenoid being electrically connected to be energized by closing said scale switch, a scale beam reset rod cam actuated from said reset member and engageable with said beam to elevate said pan, limit switches on the inlet and outlet sides of said conveyor and positioned to be closed by cartons positioned adjacent thereto on said conveyor, said limit switches being electrically connected in series with said scale switch, said reset solenoid being electrically connected in series with all said switches, a carton control cam shaft driven from said reset member, means including an outlet stop cam on said cam shaft and movable transversely of said conveyor to hold a carton in contact with said outlet limit switch, means including a carton inlet cam on said cam shaft and movable transversely of said conveyor to permit a single carton to enter said scale pan, and means including a scale pan stop cam on said cam shaft and movable transversely of said conveyor to hold a carton over said pan.

38. An automatic filling and weighing machine comprising a continuously driven conveyor, a continuously driven drive shaft, a scale pan and beam positioned to lift cartons off said conveyor at a weighing station, a hopper having a spout positioned over said pan, a reset member rotatably mounted on said machine, a clutch member disengageably connecting said reset member to said shaft and spring urged to clutch engaging position, a catch engageable with said clutch member to hold the same in disengagement from said shaft, a lock member releasably engageable with said catch to prevent movement thereof out of engagement with said clutch member, a reset solenoid mechanically connected to release said lock member from said catch, a cam rotatable by said reset member and engageable with said catch in the clutch disengaged position thereof to reengage said catch with said clutch member, a rock shaft journalled in said machine, a shutter in said spout, a shutter control arm on said rock shaft and connected to said shutter, a reset arm on said rock shaft and cam controlled from said reset member to move said shutter arm to feeding position, a spring urging said rock shaft to stop feed position, a trigger releasably engageable with said rock shaft in the feeding position thereof, a feed control solenoid mechanically connected to said trigger to disengage the same from said rock shaft, a pan switch positioned to be closed upon lowering of said pan and electrically connected to energize said feed control solenoid, a carton discharge member spring urged to engage said beam and lower said pan below said conveyor, a second lock member releasably engageable with said discharge member to prevent movement thereof to beam engaging position, a carton discharge solenoid mechanically connected to retract said second lock member from said discharge member, said carton discharge solenoid being electrically connected to be energized by closing said scale switch, a scale beam reset rod cam actuated from said reset member and engageable with said beam to elevate said pan, limit switches on the inlet and outlet sides of said conveyor and positioned to be closed by cartons positioned adjacent thereto on said conveyor, said limit switches being electrically connected in series with said scale switch, said reset solenoid being electrically connected in series with all said switches, a carton control cam shaft driven from said reset member, means including an outlet stop cam on said cam shaft and movable transversely of said conveyor to hold a carton in contact with said outlet limit switch, and means including a carton inlet cam on said cam shaft and movable transversely of said conveyor to admit a single carton to said pan.

39. An automatic filling and weighing machine comprising a continuously driven conveyor, a continuously driven drive shaft, a scale pan and beam positioned to lift cartons off said conveyor at a weighing station, a hopper having a spout positioned over said pan, a reset member rotatably mounted on said machine, a clutch member releasably connecting said reset member to said shaft and spring urged to engaged position, a catch releasably engageable with said clutch member to hold the same in disengaged position and spring urged toward disengagement from said clutch member, a lock member engageable with said catch to oppose the release of said clutch member by said catch, a reset solenoid mechanically connected to retract said lock member from said catch, a cam rotatable by said reset member and engageable with said catch in the disengaged position thereof to reengage said catch with said clutch member, a rock shaft rotatably mounted on said machine, a shutter in said spout, a shutter control arm on said rock shaft and rotatable therewith and connected to said shutter, a reset arm on said rock shaft and cam controlled from said reset member to move said rock shaft and shutter arm to feeding position, a spring urging said rock shaft to stop feed position, a trigger positioned to engage and hold said rock shaft in feeding position, a feed control solenoid mechanically connected to retract said trigger from said rock shaft, a pan switch positioned to be closed upon lowering of said pan and electrically connected to actuate said feed control solenoid, a carton discharge member spring urged to engage said beam and lower said pan below said conveyor, a second lock member positioned to engage said discharge member and prevent movement thereof to pan lowering position, a carton discharge solenoid mechanically connected to said second lock member to retract the same from said discharge member, said carton discharge solenoid being electrically connected to be energized by closing said scale switch, a scale beam reset rod cam actuated from said reset member and engageable with said beam to elevate said pan, a limit switch on one side of said conveyor and positioned to be closed by cartons positioned adjacent thereto on said conveyor, said limit switch being electrically connected in series with said scale switch, said reset solenoid being electrically connected in series with all said switches, a carton control cam shaft driven from said reset member, and means including a carton inlet cam on said cam shaft and movable transversely of said conveyor to admit a single carton to said pan.

FRANKLIN M. WILLBRANDT.

REFERENCES CITED

The following references are of record in the file of this patent:

UNITED STATES PATENTS

| Number | Name | Date |
|---|---|---|
| 1,402,934 | Hoepner | Jan. 10, 1922 |
| 1,631,117 | Bent | June 7, 1927 |
| 1,883,233 | Richard | Oct. 18, 1932 |
| 1,986,069 | Richard | Jan. 1, 1935 |
| 2,037,484 | Raymer et al. | Apr. 14, 1936 |
| 2,076,617 | Cleaves | Apr. 13, 1937 |
| 2,353,005 | Behrent et al. | July 4, 1944 |
| 2,354,087 | Raymer | July 18, 1944 |